Figure 1:
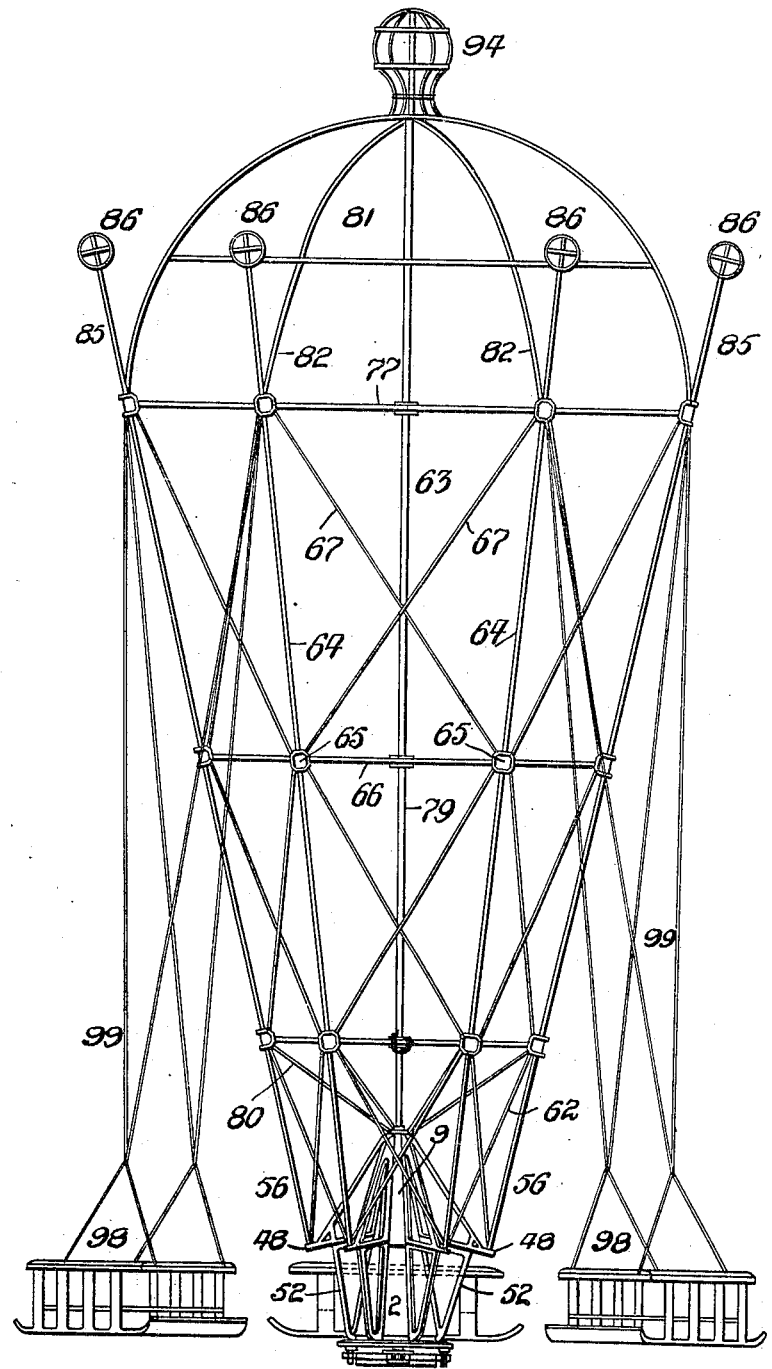

No. 830,838. PATENTED SEPT. 11, 1906.
F. INGERSOLL.
AMUSEMENT DEVICE.
APPLICATION FILED JAN. 27, 1906.
12 SHEETS—SHEET 2.
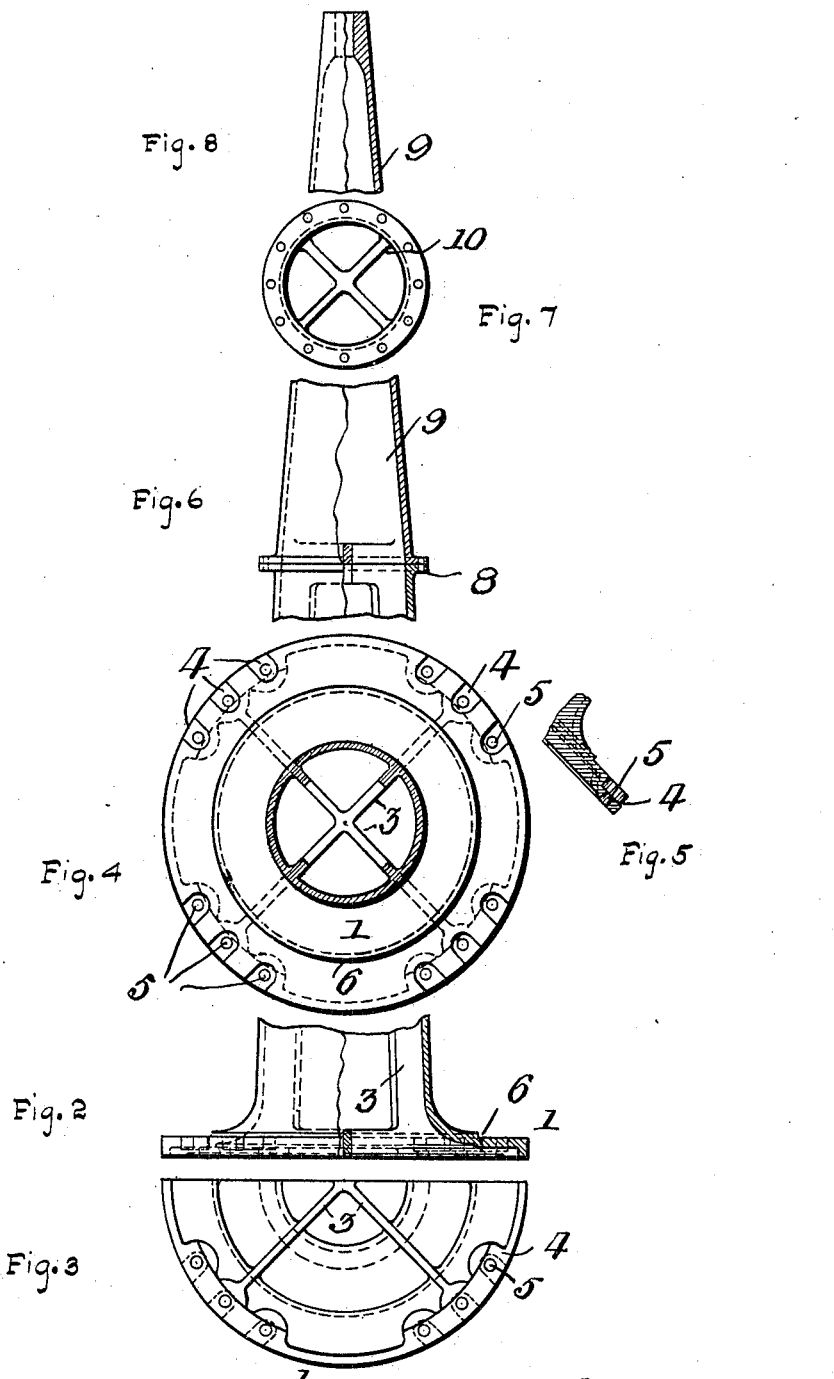
WITNESSES
INVENTOR
Frederick Ingersoll,
By
ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 3.
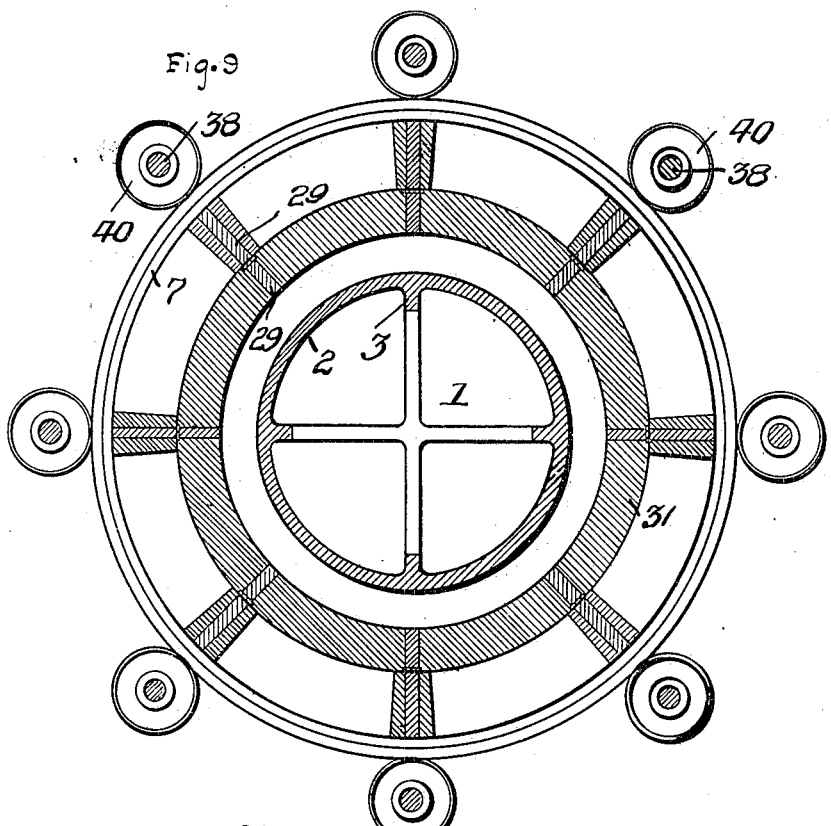
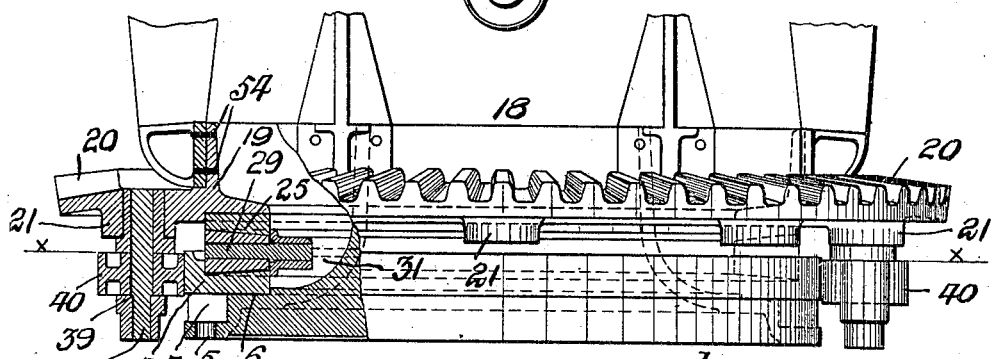
WITNESSES
E. A. Prokop.
D. H. Butler.
INVENTOR
Frederick Ingersoll,
By N. E. Everett Co.
ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 4.
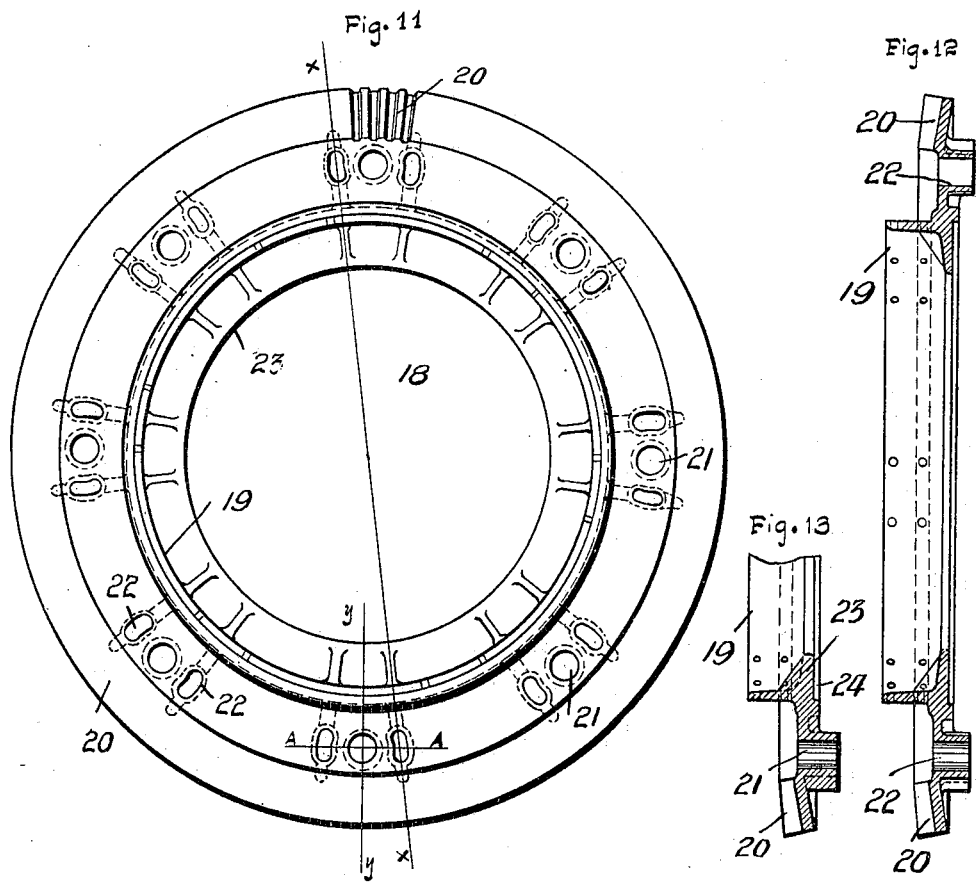
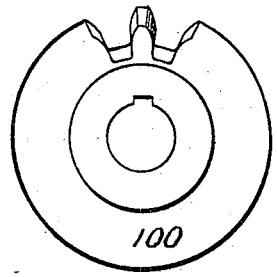
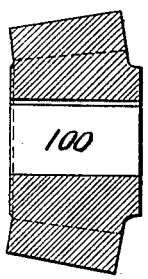
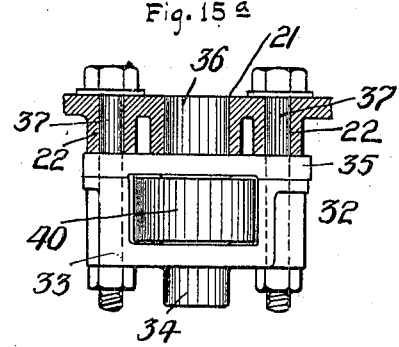
WITNESSES
E. A. Prokop.
INVENTOR
Frederick Ingersoll,
By
ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 5.
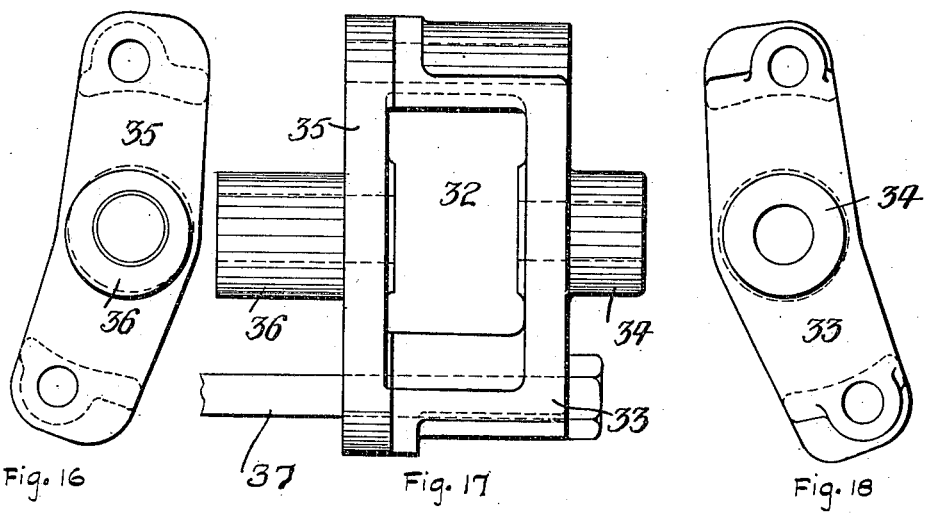
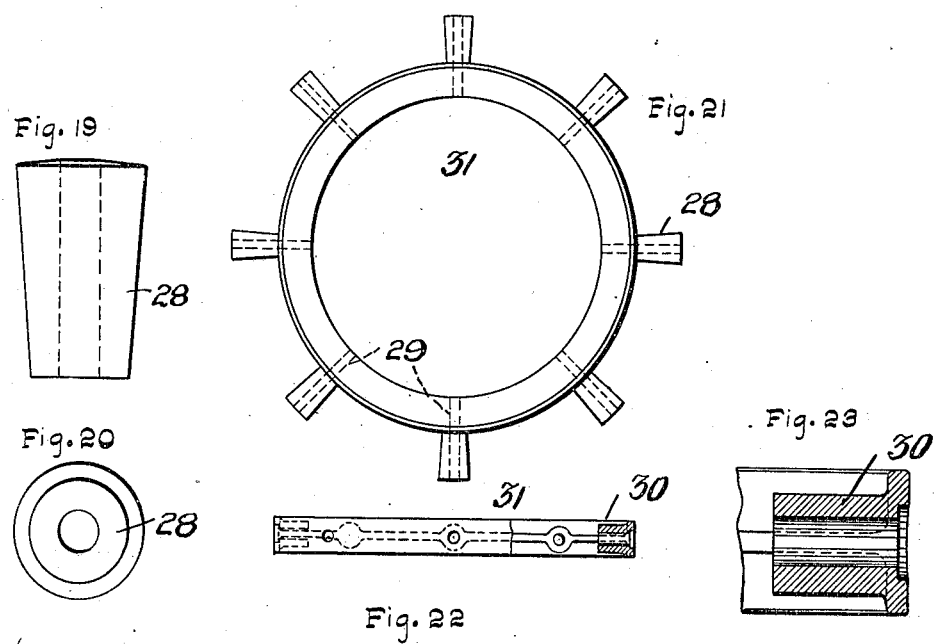
WITNESSES
E. A. Prokop
INVENTOR
Frederick Ingersoll,
By ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 6.
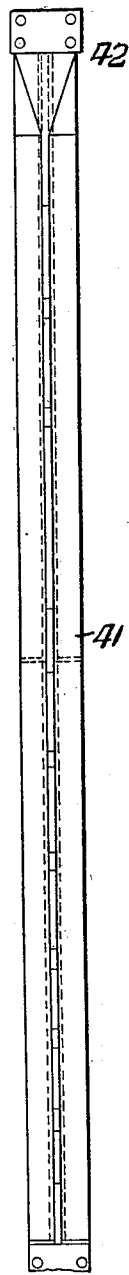
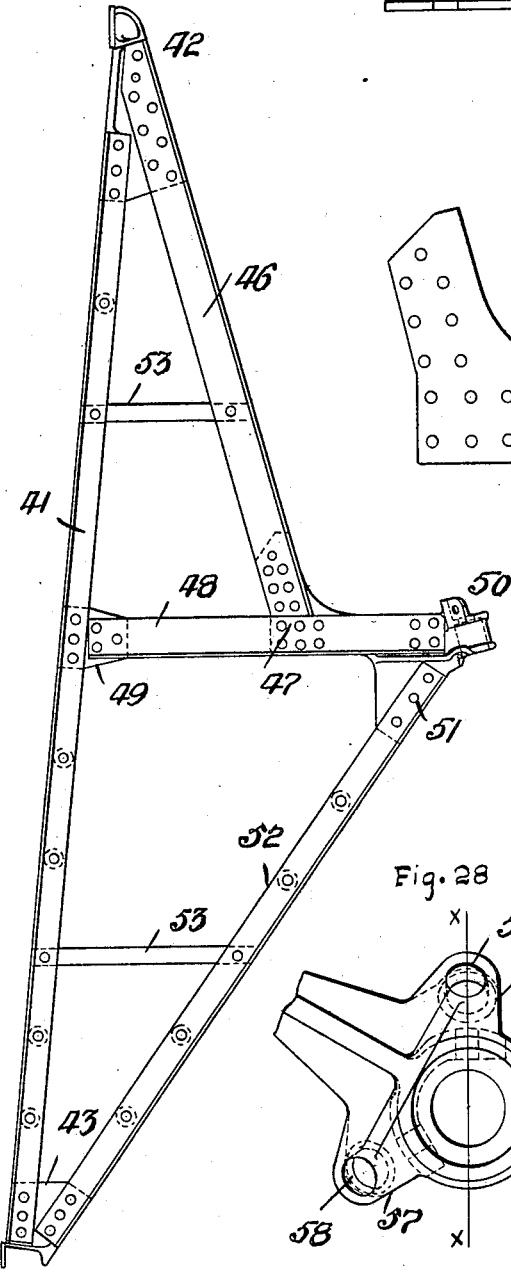
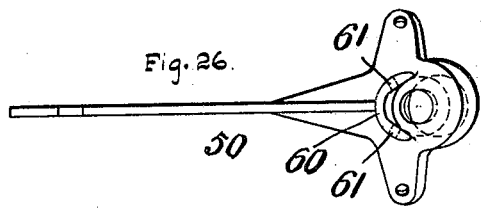
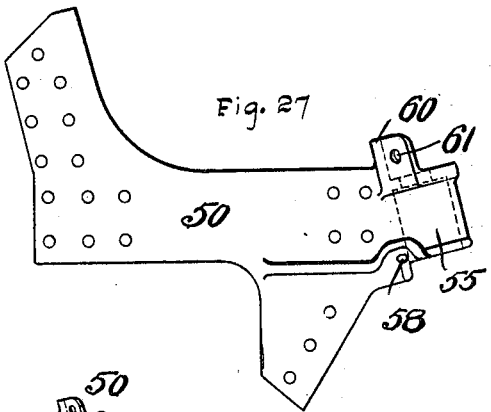
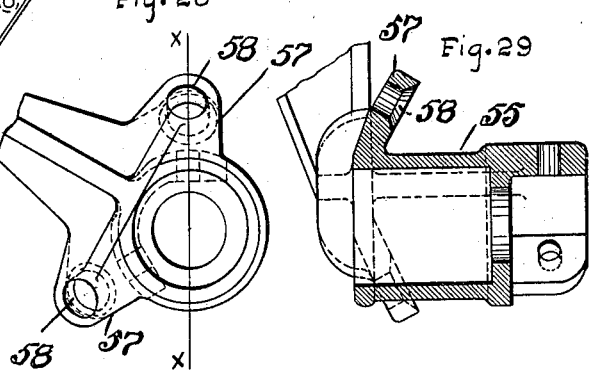
WITNESSES
INVENTOR
Frederick Ingersoll,
BY ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 7.
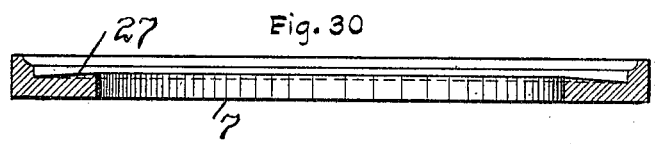
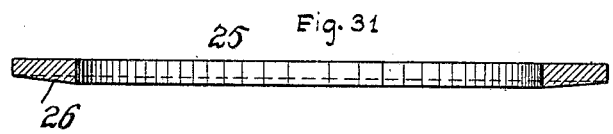
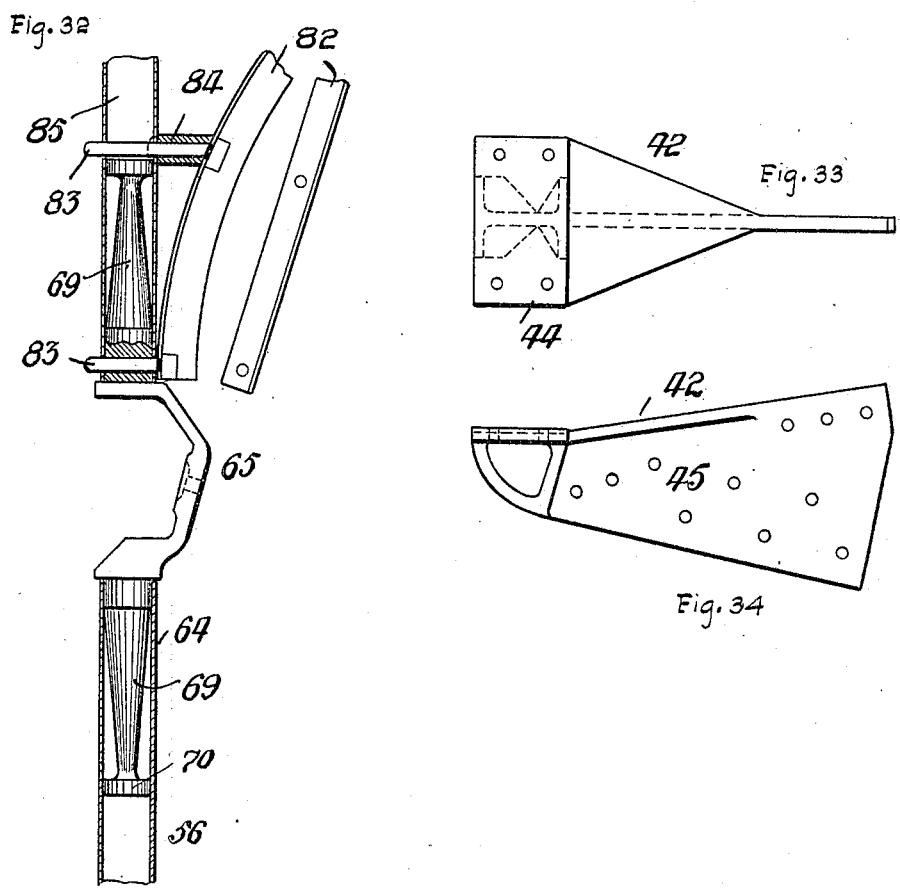
WITNESSES
E. A. Prokop.
D. H. Butler
INVENTOR
Frederick Ingersoll,
By H. C. Evert & Co.
ATTORNEYS No. 830,838. PATENTED SEPT. 11, 1906.
F. INGERSOLL.
AMUSEMENT DEVICE.
APPLICATION FILED JAN. 27, 1906.

12 SHEETS—SHEET 8.

WITNESSES
INVENTOR
Frederick Ingersoll,
By
ATTORNEYS

No. 830,838. PATENTED SEPT. 11, 1906.
F. INGERSOLL.
AMUSEMENT DEVICE.
APPLICATION FILED JAN. 27, 1906.

12 SHEETS—SHEET 9.

WITNESSES
E. A. Prokop.

INVENTOR
Frederick Ingersoll
By
ATTORNEYS

THE NORRIS PETERS CO., WASHINGTON, D. C.

No. 830,838. PATENTED SEPT. 11, 1906.
F. INGERSOLL.
AMUSEMENT DEVICE.
APPLICATION FILED JAN. 27, 1906.
12 SHEETS—SHEET 10.
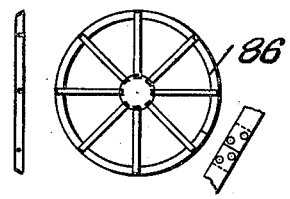
Fig. 47
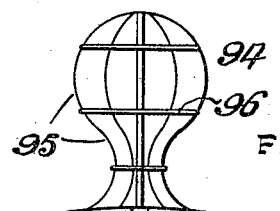
Fig. 46
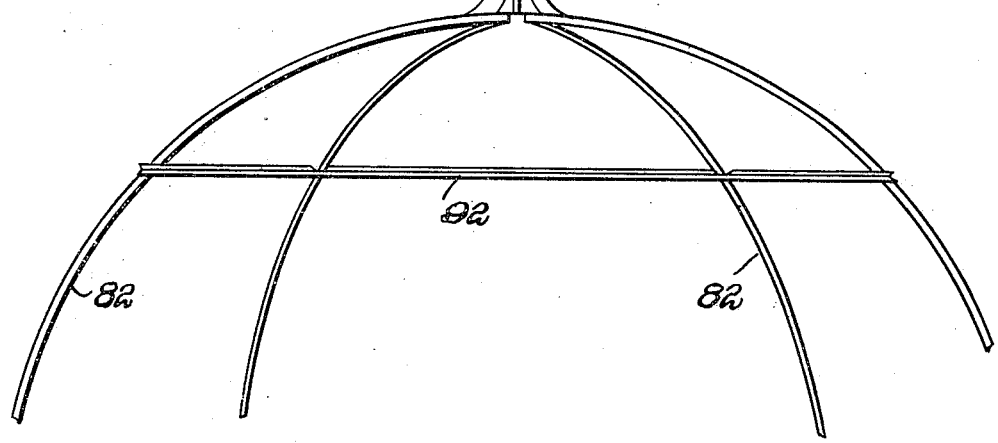
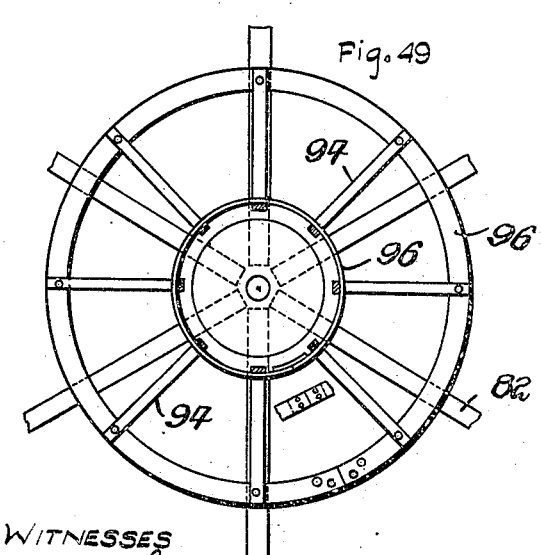
Fig. 49
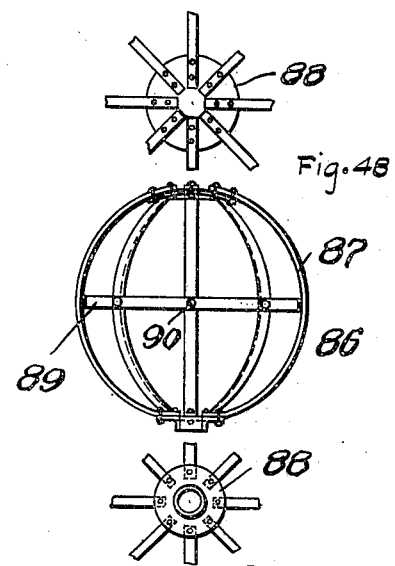
Fig. 48
WITNESSES
E. A. Prokop.
R. N. Butler.
INVENTOR
Frederick Ingersoll,
By H. C. Evert & Co.
ATTORNEYS No. 830,838. PATENTED SEPT. 11, 1906.
F. INGERSOLL.
AMUSEMENT DEVICE.
APPLICATION FILED JAN. 27, 1906.
12 SHEETS—SHEET 11.
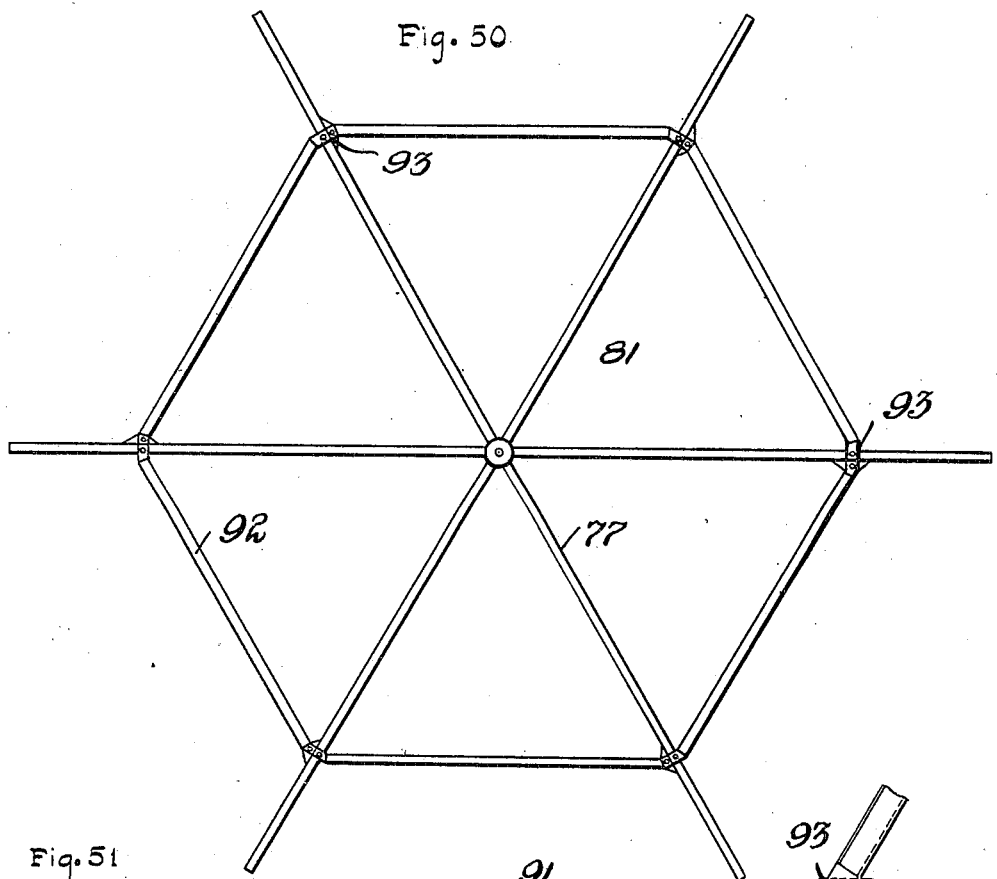
Fig. 50.
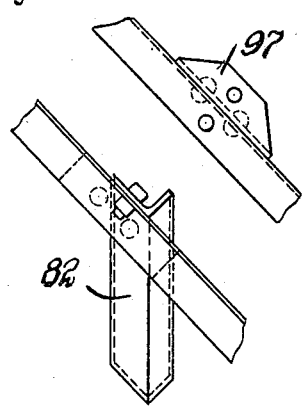
Fig. 51.
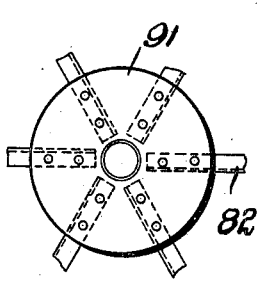
Fig. 53.
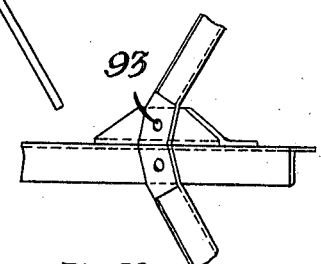
Fig. 52.
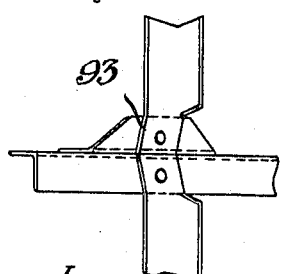
WITNESSES
E. A. Crofoot.
R. N. Butler.
INVENTOR.
Frederick Ingersoll,
By Everts & Co.
ATTORNEYS

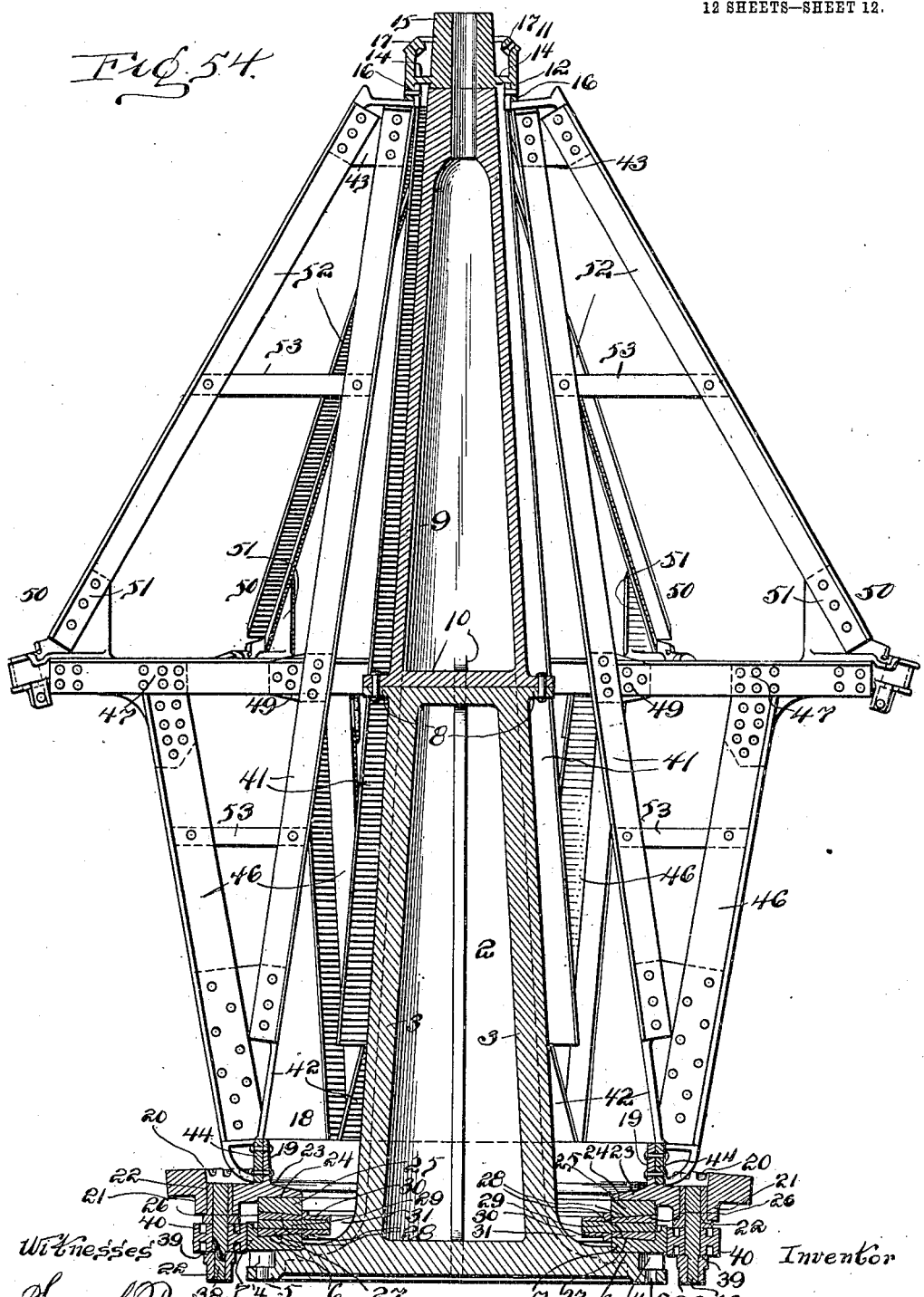

UNITED STATES PATENT OFFICE.

FREDERICK INGERSOLL, OF PITTSBURG, PENNSYLVANIA.

AMUSEMENT DEVICE.

No. 830,838.  Specification of Letters Patent.  Patented Sept. 11, 1906.

Application filed January 27, 1906. Serial No. 298,185.

*To all whom it may concern:*

Be it known that I, FREDERICK INGERSOLL, a citizen of the United States of America, residing at Pittsburg, in the county of Allegheny and State of Pennsylvania, have invented certain new and useful Improvements in Amusement Devices, of which the following is a specification, reference being had therein to the accompanying drawings.

This invention relates to certain new and useful improvements in amusement devices; and the invention relates more particularly to that type of amusement apparatus commonly known as a "circle-swing," "roundabout," or "merry-go-round."

The invention has for its primary object to provide an apparatus of the type stated above wherein a plurality of carriages or chariots are suspended to be operated and caused to move or swing in a circular or curvilinear path, whereby persons occupying the carriages or chariots may experience sensation similar somewhat to that of flying through space.

The invention has for its further object to provide a strong, durable, and equally-balanced apparatus particularly adapted for amusement-parks and like places.

The invention in its broadest aspect involves positive and reliable means for operating a "circle-swing," as it will be hereinafter termed, in an undulatory manner while the apparatus is in motion. To this end I have devised an apparatus embodying a plurality of structural elements which when combined produce a safe and comparatively inexpensive apparatus.

The principal elements of the invention—namely, a base and pedestal, a non-frictional equally-balanced bearing-frame, revoluble supporting-frames, supporting-outriggers, a dome, and carriages or chariots suspended from said dome—will be hereinafter separately and specifically described in detail, together with the novel arrangement and objects accomplished from such a combination of elements.

The preferred embodiments of my invention are illustrated in the drawings accompanying this application; but I desire it to be understood that the same are susceptible to various changes without departing from the scope of the invention.

Reference now being had to the drawings accompanying this application, like numerals of reference designate corresponding parts throughout the several views, in which—

Figure 35:
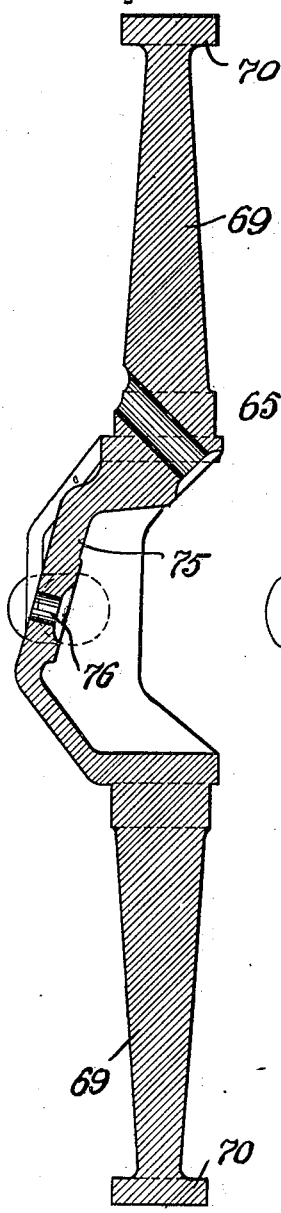
Figure 36:
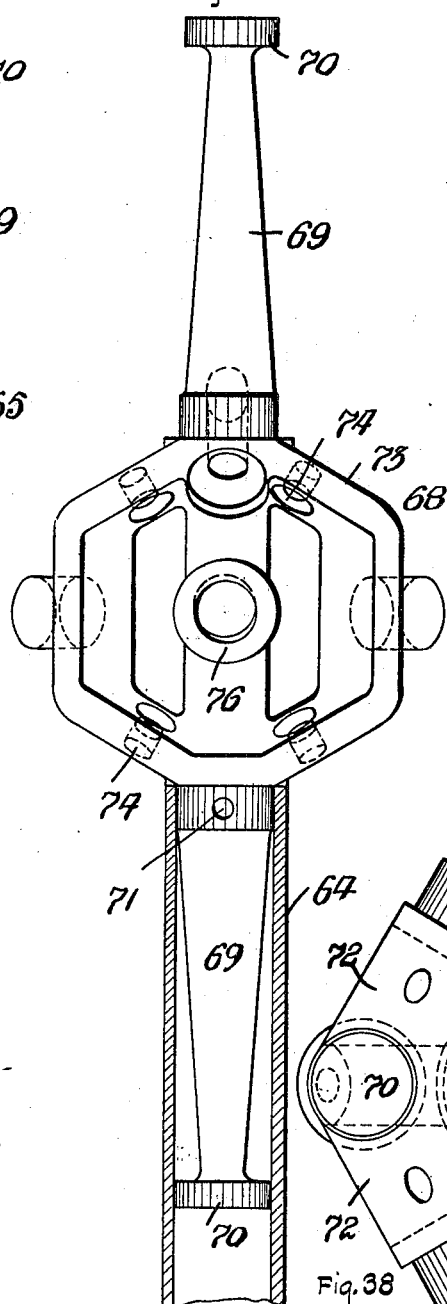
Figure 37:
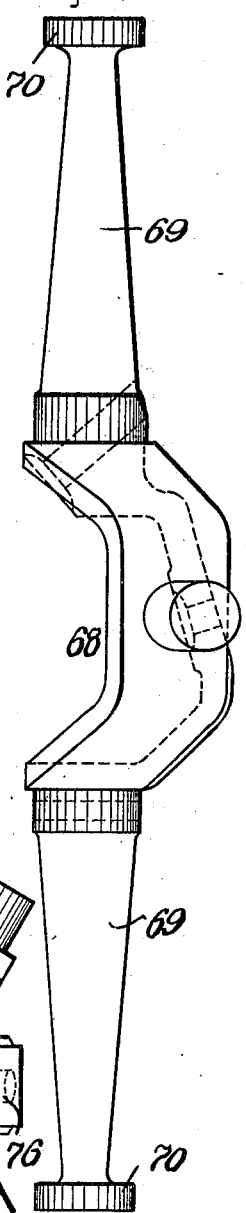
Figure 38:
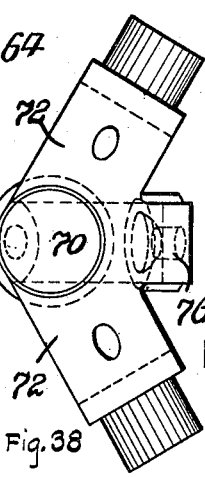
Figure 39:
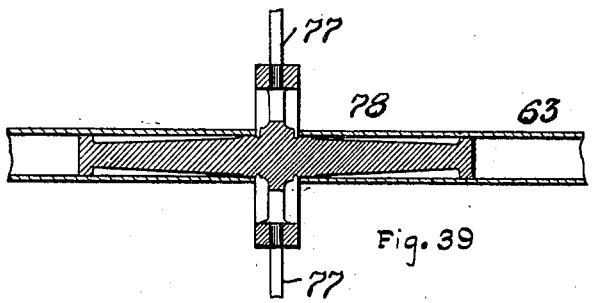
Figure 40:
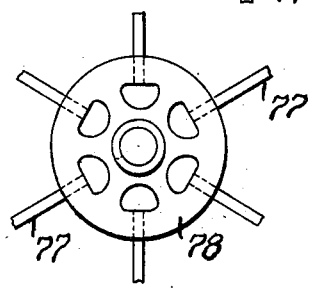
Figure 41:
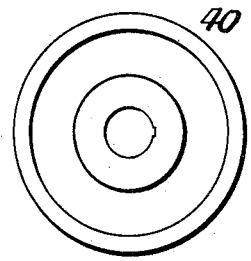
Figure 42:
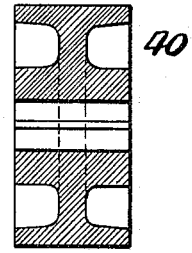
Figure 45:
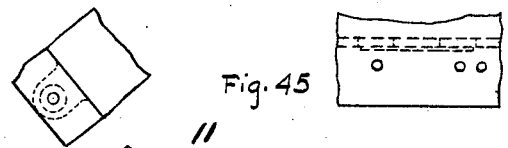
Figures 43, 44:
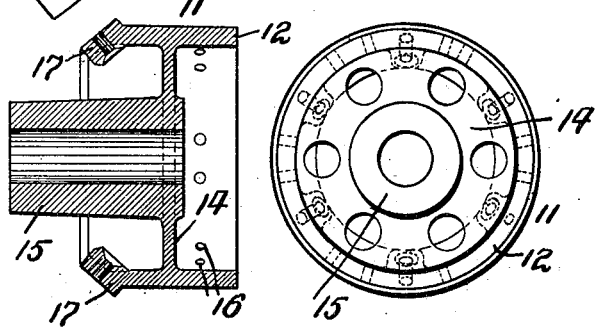

Figure 1 is a diagrammatic side elevation of my improved apparatus. Fig. 2 is a fragmentary side elevation of the base of a pedestal or tower, partly in section. Fig. 3 is a bottom plan of a portion of the base. Fig. 4 is a horizontal sectional view of a pedestal or tower used in connection with the apparatus, illustrating the base thereof in plan. Fig. 5 is a detail fragmentary sectional view of the base. Fig. 6 is a side elevation of a portion of the pedestal or tower constructed in accordance with my invention. Fig. 7 is a bottom plan of the same. Fig. 8 is a side elevation, partly in section, of the top of the pedestal or tower. Fig. 9 is a horizontal sectional view of the bearing-frame and the base of the apparatus. Fig. 10 is a side elevation of the same, partly in section. Fig. 11 is a plan of the bearing-frame. Fig. 12 is a cross-sectional view taken on the line $x\ x$ of Fig. 11. Fig. 13 is a detail sectional view taken on the line $y\ y$ of Fig. 11. Fig. 14 is a plan of a pinion adapted to be used in connection with the bearing-frame for revolving the same. Fig. 15 is a vertical sectional view of the same. Fig. 15[a] is a detail sectional view of a portion of the bearing-frame. Fig. 16 is a view of one side of a bearing-housing used in connection with the apparatus. Fig. 17 is a front elevation of the same. Fig. 18 is a view of the opposite side of the housing. Fig. 19 is a plan of a cone-shaped bearing used in connection with the apparatus. Fig. 20 is an end view of the same. Fig. 21 is a plan of a bearing-guide frame. Fig. 22 is a side elevation of the same, partly in section. Fig. 23 is an enlarged detail sectional view of a portion of the frame. Fig. 24 is an edge view of one of the supporting-frames of the apparatus. Fig. 25 is a side elevation of the same. Fig. 26 is an enlarged plan of one of the castings used in connection with the supporting-frame. Fig. 27 is an enlarged side elevation of the same. Fig. 28 is a detail plan of a portion of the casting illustrated in Figs. 26 and 27. Fig. 29 is a sectional view of the casting, taken on the line $x\ x$ of Fig. 28. Fig. 30 is a cross-sectional view of a bearing-ring used in connection with the bearing-frame of the apparatus. Fig. 31 is a similar view of another ring. Fig. 32 is a detail sectional view of a supporting-coupling used in connection with the outriggers of the apparatus. Fig. 33 is a plan of the casting used in connection with one of the revoluble supporting-frames. Fig. 34 is a side elevation of the same. Fig. 35 is a vertical sectional view of one of the outrigger-couplings. Fig. 36 is a front elevation of the same. Fig. 37 is a side elevation of the same. Fig. 38 is a plan of the coupling. Fig. 39 is a sectional view of a coupling used in connection with the central standard of the apparatus. Fig. 40 is an end view of the same. Fig. 41 is a side elevation of a roller-bearing used in connection with the bearing-frame of the apparatus. Fig. 42 is a vertical sectional view of the same. Fig. 43 is a sectional view of a cap used in connection with the pedestal of the apparatus. Fig. 44 is a plan of the same; Fig. 45, detail views of a portion of the cap. Fig. 46 is a fragmentary side elevation of a dome comprising the top of the apparatus. Fig. 47 is a plan of one of the spherical bodies carried by the dome as an ornament. Fig. 48 is a sectional view of the same. Fig. 49 is a horizotal sectional view of a central ornamental body carried by the dome. Fig. 50 is a plan of a portion of the dome. Figs. 51, 52, and 53 are detail views of a construction of portions of the dome. Fig. 54 is a central vertical sectional view of the pedestal, cap, bearing-frame, bearings, supporting-frames, &c., assembled in their working relations.

The circle-swing or apparatus in its entirety is constructed of strong and durable metal, consisting of castings, angle-bars, and tubular frames or braces, which are assembled to provide a rigid non-frictional equibalanced frame, from which a plurality of cars, carriages, or chariots may be suspended. When the apparatus is in operation and the frame is revolved, the centrifugal force exerted by the revolving frame is adapted to swing the carriages or chariots outwardly to travel in a circular path, from which they may be deviated by reducing the speed at which the apparatus is operated to cause them to travel in a curvilinear path. Throughout the entire construction of the apparatus I have aimed to produce a safe apparatus which can be operated in an undulatory manner, whereby the structure will not be subjected to strains or stresses when in operation.

Considering the various elements of the invention in detail, reference will first be had to the base and pedestal of the apparatus.

*Base and pedestal.*—The base 1 and a portion of the pedestal or tower 2 is made of a casting and consists of a hollow frusto-conical-shaped pedestal having a flared annular base. The annular base 1 and the pedestal 2 are braced by radially-disposed vertical ribs 3, which extend from the base 1 upwardly within the pedestal 2. The outer edges of the base are recessed, as at 4, and pierced, as at 5, in order that the base may be firmly anchored to a suitable foundation. The base is also provided with an annular shouldered recess 6, upon which is adapted to rest a bearing-ring 7, forming part of the bearing-frame to be presently described. The upper end of the pedestal 2 is provided with an annular pierced flange 8, to which is secured a supplemetary pedestal or tower 9, having inner bracing-ribs 10 similar to the lower portion of the pedestal.

Upon the upper end of the supplementary pedestal or tower 9 is revolubly mounted a cap 11. (See Figs. 43, 44, and 54.) The cap consists of a sleeve 12, having a central spider-frame 14, which supports a collar 15. The lower end of the sleeve 12 is provided with sets of apertures 16, while the upper end of the sleeve above the spider-frame 14 is flared inwardly and provided with pierced bosses 17. The object of said bosses, together with the apertures 16, will presently appear.

*Bearing-frame.*—Surrounding the pedestal 2 and supported by the base 1 is a non-frictional equibalanced bearing-frame, said frame comprising an annulus or ring 18, having an inner vertically-disposed pierced flange 19. (See Figs. 11, 12, 13, and 54.) The outer edges of the annulus or ring 18 are formed with a circular rack 20, and between the flange 19 and said rack the annulus or ring is provided with depending bearings 21, which are disposed radially to the axis of said annulus or ring. Circumferentially arranged relative to the annulus or ring 18 and at each side of the bearings 21 are segment-shaped depending collars 22, the openings in said collars being formed upon an arc having for its center the axis of the bearings 21, in connection with which said collars are used. The annulus or ring 18 is formed with an inwardly-extending flange 23, the bottom side of which forms a seat 24 for a bearing-ring 25, (see Figs. 10, 31, and 54,) said ring 25 having a beveled bearing-face 26.

The bearing-ring 7, mounted upon the base 1, (see Figs. 30, 54,) is provided with a beveled bearing-surface 27, (see Fig. 30,) upon which is mounted a plurality of revoluble cone-shaped rollers or bearings 28. The rollers or bearings 28 are journaled upon pins 29, mounted in radially-disposed bosses 30, carried by a guide-frame 31. (See Fig. 21.) The cone-shaped rollers or bearings 28 are adapted to travel upon the bearing-ring 7, and upon said rollers rests the bearing-ring 25. Supported by the bearing-ring is the annulus or ring 18, previously described.

Mounted within the bearings 22 and the collars 21 21 of the annulus or ring 18 are two-part bearing-housings 32. (See Fig. 17.) Each bearing consists of an angular housing 33, carrying a depending collar 34, and a cap 35, carrying an upwardly-extending collar 36. The housing 33 and the cap 35 are secured together by bolts 37, (see Fig. 15ª,)

which pass through the ends of the housing 33 and cap and extend upwardly through the collars 22 22 upon each side of the opening in which the bearing-housing is mounted, said bolts supporting the bearing-housings, at the same time guiding them in their movement. Journaled within each bearing is an upwardly-extending pin 38, which is provided with an annular shoulder 39 in order that the pin may be retained within the housing. Upon each pin is keyed or otherwise mounted a roller 40, adapted to engage the periphery of the bearing-ring 7. As the bearing-frame, particularly the annulus or ring 18, is revolved the rollers 40 are adapted to engage the periphery of the bearing-ring 7 and together with the cone-shaped rollers 28 perfectly balance the ring or annulus 18 upon the base of the apparatus. The bearing-housings 32 are arranged at a slight angle, whereby they will conform to the periphery of the bearing-ring 7, also permitting of a slight adjustment through the medium of the segment-shaped collars 22 and the bolts 37, which permit of the bearing-housing partially rotating relative to the ring or annulus 18. The rollers 40 are adapted to maintain the annulus or ring 18 in proper position upon the cone-shaped rollers 28 and are adapted to equalize strains and stresses upon the bearing-frame which may tend to shift the annulus or ring 18 relative to the cone-shaped rollers 28. The inwardly-tapering rollers 28, together with the bearing-rings 7 and 25, are also adapted to equalize the strains and stresses that may be exerted upon the revoluble bearing-frame and in conjunction with the rollers 40 insure a perfect equilibrium of the entire apparatus.

*Revoluble supporting-frames.*—The frames, of which there are six in number, or may be more according to the size of the apparatus, are secured to the cap 11 of the supplementary pedestal or tower 9 and to the flange 19 of the ring or annulus 18. Each frame is substantially triangular in outline (see Figs. 24, 25) and consists of an angularly-disposed strut 41, carrying a casting 42 upon its upper end and a casting 43 upon its lower end. The casting 42 (see Figs. 33 and 34) comprises a pierced plate 44, which is secured to the sleeve 12 of the cap 11 by bolts or rivets engaging in the sets of apertures 16, afore referred to. The integral web portion 45 of the casting 42 has attached thereto the upper end of an inclined brace 46, which is secured at its lower end, as at 47, to an outwardly-extending arm 48, the rear end of which arm is secured by a plate 49 to the strut 41 of the frame. The extreme outer end of the arm 48 is provided with a casting 50, which is secured, as at 51, to the upper end of an inclined strut-brace 52, said brace at its lower end being attached to the casting 43. The strut-brace 52 and the brace 46 are braced by bars 53 53 from the strut 41 of the frame. The casting 43 is secured to the pierced flange 19 of the ring or annulus 18 by bolts or rivets 54, as clearly illustrated in Fig. 10 of the drawings.

The castings 50, which are of a peculiar formation, are constructed whereby the main skeleton frame, particularly the outriggers thereof, may be fastened thereto to form a rigid structure. Each casting consists of a sleeve 55, adapted to receive the outriggers 56 of the main skeleton frame. The sleeve 55 of each casting carries outwardly-extending lugs 57 57, having angularly-disposed openings 58 58 formed therein, adapted to receive the ends of spacing-bars, (not shown,) whereby the supporting-frames can be equally spaced around the pedestal or tower of the apparatus. The top of the sleeve 55 is provided with a semicircular flange 60, having openings 61 61 formed therein to receive the ends of tie-rods 62 62.

*Supporting-outriggers.*—The main skeleton framework of the apparatus (see Fig. 1) is balloon-shaped, and consists of a central standard 63, which is surrounded by a plurality of outriggers 56, said outriggers being supported from the central standard 63 and from the supporting-frames just described of the pedestal. Each outrigger consists of a plurality of tubular rods 64, which are connected together by couplings 65, said couplings being connected together by spacing-bars 66 and tie-rods 67 67. The spacing-bars 66 form a framework which is hexagon shape in cross-section, and these bars serve to brace and maintain the main skeleton framework of the apparatus. Each one of the couplings (see Figs. 35 to 38) consists of a hexagon-shaped body portion 68, carrying diametrically opposed tapering shanks 69 69, having heads 70 70 upon their outer ends of a diameter equivalent to the base of the shanks 69. The shanks 69 are adapted to extend into the tubular rods 64 comprising the outriggers and are secured therein by pins or bolts passing through openings 71 formed in the shanks 69 of each coupling. The body portion 68 of each coupling is provided with diametrically-disposed sleeves 72, in which are secured the ends of the brace-bars 66. The angularly-disposed edges 73 of the couplings are provided with openings 74 to receive the tie-rods 67 67 of the main skeleton framework. The angularly-disposed face 75 of each coupling is provided with an opening 76 to receive the ends of the converging rods 77, that are secured to a central coupling 78, (see Fig. 40,) carried by the central standard 63 of the apparatus, this standard comprising a plurality of tubular sections 79, which are connected together by couplings 78, (see Fig. 39,) similar in construction to the couplings 75. The lowermost section of the central standard is secured in or upon the sleeve 15 of the cap 11.

The lowermost set of couplings 65 are connected by tie-rods 80 to the cap 11 of the supplementary pedestal 9, the ends of the tie-rods entering the openings formed in the bosses 17 of said cap.

*Dome.*—The uppermost set of outrigger-couplings supports a dome 81, which forms the top of the apparatus. The dome is constructed of light angle-iron and is substantially semispherical in contour to give the main skeleton frame a finished and attractive appearance. The arc-shaped angle-irons 82 are secured to the uppermost couplings by tie-bolts 83 83, (see Fig. 32,) the uppermost tie-bolt being braced by a sleeve 84, interposed between the angle-irons 82 and a section of tubing 85, which extends outwardly from the dome and forms a continuation of the outriggers 56. The outer ends of the sections of tubing 85 are provided with spherical bodies 86, said bodies being formed of light metallic peripheral strips 87, having their ends secured to top and bottom plates 88 88. The peripheral strips 86 are braced by a circular strip or band 89, which is secured to the peripheral strips 87, as at 90. The spherical bodies 86 are employed simply as ornaments to give the apparatus a neat and attractive appearance, these bodies also being used for decorative purposes when it is desired to illuminate the entire apparatus by strong and powerful lights that may be conveniently located within the spherical bodies 86.

The arc-shaped angle-irons 82, forming the dome, are secured to a common plate 91, secured upon the upper end of the central standard 63. The angle-irons are braced by angle-bars 92, the ends of said bars being cut and sheared to connect the angle-irons 82, as indicated at 93 93. (See Fig. 52.)

Centrally upon the top of the dome is mounted a large spherical body 94, comprising a plurality of peripheral ribs 95 95 and transverse bands or rings 96, which connect the ribs together. The lower ends of the ribs 95 are connected to plates 97, secured to the upper ends of the arc-shaped angle-irons 82 of the dome.

The dome is substantially semispherical in shape, while the outriggers are arranged in substantially conoidal form—that is, they are arranged around the central standard circumferentially and inclined outward from said standard. The skeleton conoidal-like structure formed by the outriggers, together with the skeleton dome, forms a substantially balloon-like structure constituting the carriage-carrying structure.

Generally I prefer to make the outriggers of a sufficient length so that the upper ends thereof will project some distance beyond the lower edge or base of the dome in order that objects, as 86, may be mounted on the free upper ends of the outriggers to add to the general appearance of the structure and to facilitate obtaining desired effects, which, it will be readily perceived, may be had by electric lighting, &c.

*Carriages or chariots.*—From the uppermost couplings 65 of the apparatus are suspended cars, carriages, or chariots 98, cables 99 being used for this purpose. The carriages or chariots are adapted to accommodate a number of persons, and the cables 99 are arranged whereby the carriages or chariots will be supported in a horizontal plane when the apparatus is not being operated.

I do not care to confine myself to the type of carriage or chariot used nor to the manner in which they may be suspended from the couplings carried by the outriggers of the apparatus.

*Operation.*—In Figs. 14 and 15 of the drawings I have illustrated a pinion or gear-wheel 100, which is adapted to mesh with the circular rack 20, formed in the annulus or ring 18. The pinion or gear-wheel 100 may be revolved by a motor or driven from a suitable source of energy, such as an engine, and when revolved the pinion or gear-wheel is adapted to revolve the annulus or ring 18, carrying the supporting-frame and outriggers, and thus impart a rotary movement to the carriages or chariots suspended from the frame. In operation the carriages or chariots are adapted to swing outwardly and upwardly by centrifugal force.

From the foregoing it will be observed that I have devised an equally-balanced structural framework from which a plurality of carriages or chariots may be suspended with perfect safety, and through the medium of the bearings used in connection with the apparatus I obtain practically a non-frictional coöperation of the movable parts of the apparatus.

I do not care to confine myself to the number of supporting-frames, outriggers, carriages or chariots used in connection with the apparatus, and such changes in the minor details of construction as are permissible by the appended claims may be resorted to without departing from the spirit and scope of the invention.

What I claim, and desire to secure by Letters Patent, is—

1. In a circle-swing, the combination with the base and pedestal, of an equally-balanced bearing-frame mounted upon said base, a circular rack carried by said frame, a cap revolubly mounted upon said pedestal, a plurality of supporting-frames connected to said cap and to said bearing-frame, an outrigger carried by each one of said supporting-frames, each outrigger consisting of a plurality of tubular rods, couplings connecting said rods together, horizontal brace-bars connecting said couplings, angularly-disposed tie-rods connecting said couplings together, a dome carried by said outriggers, and a plurality of carriages or chariots suspended from some of said couplings, substantially as described.

2. In a circle-swing, the combination with a base and pedestal, bearing-rings mounted upon said base, cone-shaped rollers interposed between said bearing-rings, an equally-balanced bearing-frame supported by said rings, a circular rack carried by said frame, depending adjustable rollers carried by said frame and engaging one of said bearing-rings, a cap mounted upon said pedestal, supporting-frames carried by said bearing-frame and said cap, outriggers connected to said supporting-frames, couplings carried by said outriggers, bars connecting said couplings, tie-rods connecting said couplings, a dome carried by said outriggers, and carriages suspended from said outriggers, substantially as described.

3. In a circle-swing, the combination with a base and pedestal, of bearing-rings carried by said base, rollers mounted between said bearing-rings, a bearing-frame supported by said rings, a circular rack carried by said frame, depending adjustable rollers carried by said frame and engaging one of said bearing-rings, a plurality of supporting-frames connected with said bearing-frame and with said pedestal, an outrigger carried by each frame, a central standard carried by said pedestal and connected with said outrigger, tie-rods connecting said outriggers, a dome supported by said outriggers, and cars suspended from said outriggers, substantially as described.

4. In a circle-swing, the combination with a base and pedestal, of bearing-rings carried by said base, rollers mounted between said bearing-rings, a bearing-frame supported by said rings, a circular rack carried by said frame, adjustable rollers carried by said frame, a cap carried by said pedestal, a plurality of supporting-frames connected with said cap and with said bearing-frame, a plurality of outriggers carried by said frames, a central standard carried by said cap and connected with said outriggers, couplings connecting said outriggers, a dome supported by said outriggers, and carriages suspended from said outriggers, substantially as described.

5. In a circle-swing, the combination with a base and pedestal, of bearing-rings carried by said base, rollers mounted between said rings, a bearing-frame supported by said rings, a circular rack carried by said frame, rollers carried by said frame and engaging one of said rings, a cap carried by said pedestal, supporting-frames connected with said cap and said bearing-frame, outriggers carried by said supporting-frames, a dome supported by said outriggers, and carriages suspended from said outriggers, substantially as described.

6. In a circle-swing, the combination with a base, and pedestal, of a bearing-frame revolubly mounted upon said base, depending adjustable rollers carried by said frame, a cap carried by said pedestal, a plurality of supporting-frames connected with said cap and said bearing-frame, outriggers carried by said frames, a central standard carried by said pedestal and connected with said outriggers, couplings carried by said outriggers, tie-rods connecting said couplings, a dome supported by said outriggers, and carriages suspended from said outriggers, substantially as described.

7. In a circle-swing, the combination with a base and pedestal, of a bearing-frame revolubly mounted upon siad base, a cap carried by said pedestal, a plurality of supporting-frames, carried by said cap and said bearing-frame, outriggers supported by said frames, a central standard carried by said cap and connecting with said outriggers, a dome supported by said outriggers, carriages suspended from said outriggers, and means to revolve the first-named frame, substantially as described.

8. In a circle-swing, the combination of a base and pedestal, a bearing-frame revolubly mounted on said base, a cap carried by said pedestal, a plurality of supporting-frames carried by said cap and by said bearing-frame, outriggers supported by said supporting-frames, a central standard carried by said cap and connecting with said outriggers, carriages suspended from said outriggers, and means to revolve the bearing-frame.

9. In a circle-swing, the combination with the supporting-base and pedestal, a cap carried by the pedestal, a bearing-frame, a plurality of supporting-frames attached to said bearing-frame and to the cap carried by the pedestal, outriggers connected to the supporting-frames and each formed of a series of tubular sections, couplings connecting said sections, connections between the several couplings, cables carried by said couplings, and carriages suspended from said cables.

10. In a circle-swing, the combination with a supporting-base and pedestal, a bearing-frame on the base, a cap carried by the pedestal, and a plurality of supporting-frames arranged around the pedestal and connected at their lower ends to the bearing-frame and at their upper ends to the cap on the pedestal, of a plurality of outriggers each composed of a plurality of sections, couplings joining the sections of each outrigger together, the couplings being arranged in circumferential series, means connecting the couplings of each circumferential series together, and carriages suspended by cables from the uppermost series of the couplings.

11. In a circle-swing the combination with a supporting-base and pedestal, a bearing-frame on the base and a cap on the pedestal, a central standard mounted on the pedestal, and a plurality of supporting-frames arranged around the pedestal and connected at their respective ends to said bearing-frame and to said cap, of a plurality of outriggers connected one to each of the supporting-frames, and each formed of a plurality of sections, couplings connecting the sections of each outrigger and arranged in circumferential series, connections between the couplings of each series, separate connections between the couplings of one series and the couplings of an adjacent series, and carriages suspended from one of the series of couplings, substantially as described.

12. In a circle-swing, the combination with a supporting-base and pedestal, a plurality of supporting-frames carried thereby, a central standard, a plurality of outriggers attached at their lower ends to the supporting-frames, couplings at the upper ends of said outriggers, a dome-frame connected to said couplings, and a dome mounted on said dome-frame, and on the central standard.

13. In a circle-swing, the combination of a rotatable base and pedestal, a cap carried by the pedestal, a plurality of supporting-frames arranged circumferentially of the pedestal being connecting to the base at their lower ends and to the cap at their upper ends, a central standard supported in the cap, a plurality of outriggers circumferentially arranged in substantially conoidal form around the standard and supported one from each supporting-frame, each outrigger consisting of a plurality of tubular sections, couplings connecting the sections of each outrigger together, said couplings arranged in circumferential series, spacing-bars for the couplings of each series, tie-bars connecting each coupling to the central standard, tie-rods connecting the couplings in one series to those in the adjacent series, cables suspended from the uppermost series of couplings, and carriages suspended from said cables.

14. In a circle-swing, the combination with an upright vertical standard, and a rotatable supporting structure, of a plurality of outriggers circumferentially arranged around the standard in substantially conoidal-like form, couplings connected to the outriggers, a dome supported from the vertical standard and said couplings, and carriages suspended from said couplings.

15. In a circle-swing, a base and pedestal, a bearing-ring mounted on the base, a bearing-frame supported above the bearing-ring, rollers interposed between the bearing-ring and the bearing-frame, and rollers carried by the bearing-frame and engaging the periphery of the bearing-ring.

16. In a circle-swing, a supporting-base, a bearing-ring mounted thereon, a guide-frame carrying rollers adapted to travel on the bearing-ring, a bearing-frame mounted on said rollers, and a plurality of circumferentially-arranged rollers carried by the bearing-frame and engaging the periphery of the bearing-ring.

17. In a circle-swing, the combination with a base and pedestal, and a cap carried by said pedestal, of a bearing-ring mounted on the base, a bearing-frame mounted above the bearing-ring, rollers carried by the bearing-frame to engage the periphery of the bearing-frame, rollers interposed between the bearing-ring and the bearing-ring, a flange carried by the bearing-frame, and supporting-frames attached at their lower ends to said flange of the bearing-frame and at their upper ends to the cap carried by the pedestal.

18. In a circle-swing, the combination with a base and pedestal, and a cap carried by said pedestal, of a bearing-ring mounted on the base, a guide-frame carrying rollers adapted to travel on said ring, a second bearing-ring resting on said rollers, a bearing-frame mounted on said second bearing-ring, circumferentially-arranged rollers carried by the bearing-frame and engaging the periphery of the first-mentioned bearing-ring, and a plurality of supporting-frames attached at their lower ends to the bearing-frame and at their upper ends to the cap carried by the pedestal.

19. A bearing-ring for a circle-swing, comprising an upper and a lower member, having reversely-inclined bearing-faces, and a guide-frame located within the opening of the bearing-ring members, and carrying conical rollers engaging the bearing-faces of said members.

20. A bearing-frame and a bearing-ring for a circle-swing, comprising in combination with a supporting-base, a two-part bearing-ring, a guide-frame carrying conical rollers resting on one member of the bearing-ring and engaged by the other member of said ring, and a bearing-frame resting on one of said bearing-ring members, and carrying rollers engaging the periphery of the other of said bearing-ring members.

21. In a supporting-frame for a circle-swing, the combination with the supporting-base and pedestal, of a supporting-frame, comprising a main strut member, castings carried by the respective ends of said strut member, strut-braces attached, one at its upper end to the upper of said castings, and the other at its lower end to the lower of said castings, an arm attached at one end to the said strut member, and to which the other ends of said strut-braces are attached, and a casting carried by the outer end of said arm.

22. In a circle-swing, the combination with a supporting-base and pedestal, of a plurality of supporting-frames, each substantially triangular in form, and comprising a strut member, inclined strut-braces, and an arm, the strut-braces being connected to the strut member and to the arm, and the arm being attached to the strut member, substantially as described.

23. In a circle-swing, the combination with a rotatable base structure including a pedestal and a plurality of supporting-frames circumferentially arranged around the pedestal, a central standard supported by the pedestal, and an outrigger resting on each supporting-frame, each outrigger formed of a plurality of tubular sections, of a coupling comprising a body portion open on one side and having a plurality of openings through its walls to receive coacting elements of the swing structure, and arms carried at opposite sides of the body portion and engaging in adjacent ends of the outrigger tubular sections to connect said sections together.

24. In a circle-swing, the combination with the swing structure having a central standard and the swing-outrigger formed of hollow sections, of a coupling comprising a skeleton body portion, and arms projecting from opposite sides of the body portion, engaging in adjacent ends of the outrigger-sections, said arms frictionally engaging the inner faces of the sections at the ends of the arms only, and said skeleton body portion having a plurality of openings to receive respectively, tie-bars connecting the couplings to the central standard, tie-rods connecting the couplings together, and spacing-bars.

25. A bearing-ring for a circle-swing, comprising an upper and a lower member, a guide-frame carrying rollers engaging the bearing-faces of said upper and lower member of the bearing-ring, a bearing-frame resting on the upper bearing-ring member, a plurality of two-part bearing-housings carried by said bearing-frame, and rollers journaled in said bearing-housings and engaging the periphery of one of the bearing-ring members.

26. In combination in a circle-swing, a rotatable base structure, including a pedestal and a plurality of supporting-frames circumferentially arranged around the pedestal and connected thereto, castings carried by said supporting-frames approximately midway their length, and an outrigger structure for said swing, comprising a plurality of outriggers suitably supported and arranged circumferentially in substantially conoidal-like form and supported by said supporting-frames and secured at their lower ends in the castings carried by said frames, a plurality of couplings interposed in each outrigger intermediate its ends and arranged in circumferential series, spacing-bars connecting all of the couplings in one series together, and tie-rods connecting the couplings in one series to the couplings in another series.

27. In a circle-swing, the combination with a rotatable base structure, including a pedestal and a plurality of supporting-frames arranged circumferentially around the pedestal and connected thereto, castings carried by the supporting-frames, and a central standard carried by the pedestal, of a carriage-carrying structure embodying a plurality of outriggers supported on the castings of the supporting-frames, and arranged in substantially conoidal-like form, a plurality of couplings carried by said outriggers and arranged in series, spacing-bars connecting all the couplings in one series, tie-rods connecting the couplings in one series to the couplings in another series, cables connected at their upper ends to the couplings of one series, and carriages suspended from said cables.

28. In a circle-swing, a rotatable base structure, including a pedestal and a plurality of supporting-frames circumferentially arranged around the pedestal and connected thereto, castings carried by said supporting-frames, and a central standard carried by the pedestal, a carriage-carrying structure embodying a plurality of outriggers arranged in substantially conoidal-like form and supported on the castings of the supporting-frames, couplings carried by said outriggers intermediate their ends, spacing-bars connecting the couplings together, tie-bars connecting the couplings to the central standard, carriages suspended from the couplings, and a dome supported by the couplings and central standard.

29. In a circle-swing, a rotatable base structure, including a pedestal and a plurality of supporting-frames circumferentially arranged around the pedestal and connected thereto, castings carried by said supporting-frames, and a central standard carried by the pedestal, combined with a carriage-carrying structure embodying a plurality of outriggers seated in the castings of the supporting-frames and arranged in conoidal-like form and each formed in sections, couplings connecting the sections of each outrigger together, said couplings arranged in series around the balloon-like structure, spacing-bars connecting the couplings of each series together, tie-rods connecting the couplings of one series to the couplings of another series, tie-bars connecting the couplings to the central standard, cables suspended from said conoidal-like structure, and carriages carried by said cables.

30. In a circle-swing, a rotatable base structure, including a pedestal and a plurality of supporting-frames circumferentially arranged around the pedestal, castings carried by the supporting-frames, and a central standard carried by the pedestal, combined with a carriage-carrying structure embodying a plurality of outriggers arranged to form a substantially conoidal-like structure, and seated at their lower ends in the castings carried by said supporting-frames, couplings carried by said outriggers, spacing-bars connecting the couplings, tie-bars connecting the couplings to the central standard, a dome supported by said couplings and central standard, and carriages suspended from the balloon-like structure formed by the outriggers and dome.

31. In a circle-swing, a rotatable base structure, including a pedestal and a plurality of supporting-frames circumferentially arranged around the pedestal and connected thereto, castings carried by said supporting-frames, and a central standard carried by the pedestal, combined with a carriage-carrying structure embodying a plurality of outriggers seated at their lower ends in the castings carried by said supporting-frames, and each formed of a plurality of hollow sections, couplings connecting the sections of each outrigger together, spacing-bars connecting the couplings and spacing the outriggers apart, tie-bars connecting the couplings to the central standard, a skeleton dome supported on the couplings and forming a part of a balloon-like structure, cables carried by said couplings and carriages suspended from said cables.

32. In a circle-swing, the combination of a rotatable base structure, including a pedestal and a plurality of supporting-frames circumferentially arranged around the pedestal and connected thereto, castings carried by said supporting-frames, a central standard carried by the pedestal, a carriage-carrying structure embodying a plurality of outriggers seated at their lower ends in the castings carried by the supporting-frames, a dome joining with the outriggers adjacent the upper ends of the latter and forming therewith a substantially balloon-like structure, spacing-bars for spacing the outriggers apart, tie-bars connecting each outrigger with the standard, cables suspended from said balloon-like structure, and carriages suspended from said cables.

33. In a circle-swing, the combination of a rotatable base structure, including a pedestal and a plurality of supporting-frames circumferentially arranged around the pedestal and connected thereto, castings carried by said supporting-frames, a central standard carried by the pedestal, a carriage-carrying structure embodying a plurality of outriggers supported at their lower ends in the casting of the supporting-frames, each outrigger comprising a plurality of hollow sections, couplings joining the sections of each outrigger together, said couplings being arranged in circumferential series, spacing-bars connecting the couplings in each series and spacing the outriggers apart, tie-bars connecting the several couplings to the standard, a dome supported on the standard and joining at its lower edge with the outriggers at the uppermost series of couplings, and carriages suspended from said uppermost series of couplings.

34. In a circle-swing, the combination with a rotatable base structure, including a pedestal and a plurality of supporting-frames circumferentially arranged around the pedestal and connected thereto, castings carried by said supporting-frames, and a central standard carried by the pedestal, of a carriage-carrying structure embodying a plurality of outriggers seated at their lower ends in the castings carried by the supporting-frames and arranged circumferentially around the central standard at an angle thereto, spacing-bars intermediate the ends of the outriggers for holding the same spaced, tie-rods connecting the outriggers to the vertical standard, a dome supported on the vertical standard and having its lower edge meeting with the outriggers adjacent the upper ends of the latter, the dome and the outriggers forming a structure of substantially balloon-like form with the upper ends of the outriggers extending above the lower edge of the dome, and carriages suspended from said balloon-like structure adapted to swing outwardly therefrom as the same is rotated.

In testimony whereof I affix my signature in the presence of two witnesses.

FREDERICK INGERSOLL.

Witnesses:
E. E. POTTER,
H. C. EVERT.